United States Patent [19]
Malia

[11] 3,992,567
[45] Nov. 16, 1976

[54] INTERNAL STRESS-GRADING SYSTEM FOR ELECTRICAL CONNECTIONS

[75] Inventor: Michael W. Malia, Washington, N.J.

[73] Assignee: Amerace Corporation, New York, N.Y.

[22] Filed: Nov. 25, 1974

[21] Appl. No.: 526,614

[52] U.S. Cl. .............................. 174/73 R; 339/60 R
[51] Int. Cl.² .................. H02G 15/08; H01R 13/52
[58] Field of Search ........... 174/73 R, 73 SC, 75 D; 339/59 R, 60 R, 60 C, 61 R, 143 R, 143 C

[56] References Cited
UNITED STATES PATENTS

| | | | |
|---|---|---|---|
| 3,656,084 | 4/1972 | Malia | 174/73 R UX |
| 3,692,922 | 9/1972 | Sugimoto et al. | 174/73 R |
| 3,796,821 | 3/1974 | Lusk | 174/73 R |
| 3,816,640 | 6/1974 | Varner | 174/73 R |

OTHER PUBLICATIONS

Two Pages of a Bulletin entitled "Elastimold Permanent Splice for Shielded Cable 17-KV and Below-Style 25-S" published June 30, 1967 by Elastimold Division of Elastic Stop Nut Corporation of America, Esna Park, Hackettstown, N.J.

Primary Examiner—Laramie E. Askin
Attorney, Agent, or Firm—S. Michael Bender; Arthur Jacob

[57] ABSTRACT

An internal stress-grading system for protecting against deleterious electrical stress concentration within an electrical connection in which pre-molded elastomeric component parts are assembled to complete the connection. The system includes internal portions of conductive elastomeric material establishing an internal shield of assembled segments, the portions of conductive elastomeric material being joined with portions of insulating elastomeric materials within each component part along a generally continuous, void-free juncture, the juncture following a continuous contour which has an arcuate salient profile defining the boundary of the conductive elastomeric portion at each joint between consecutive shield segments.

11 Claims, 2 Drawing Figures

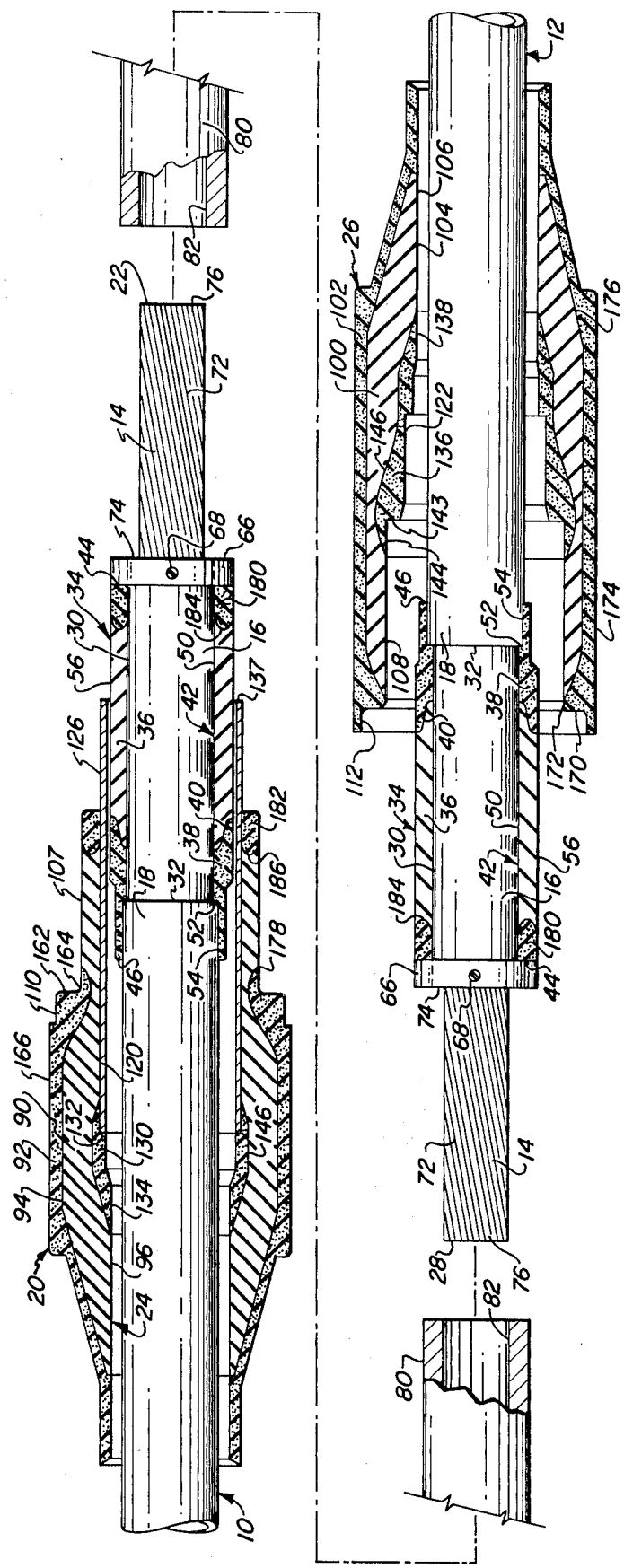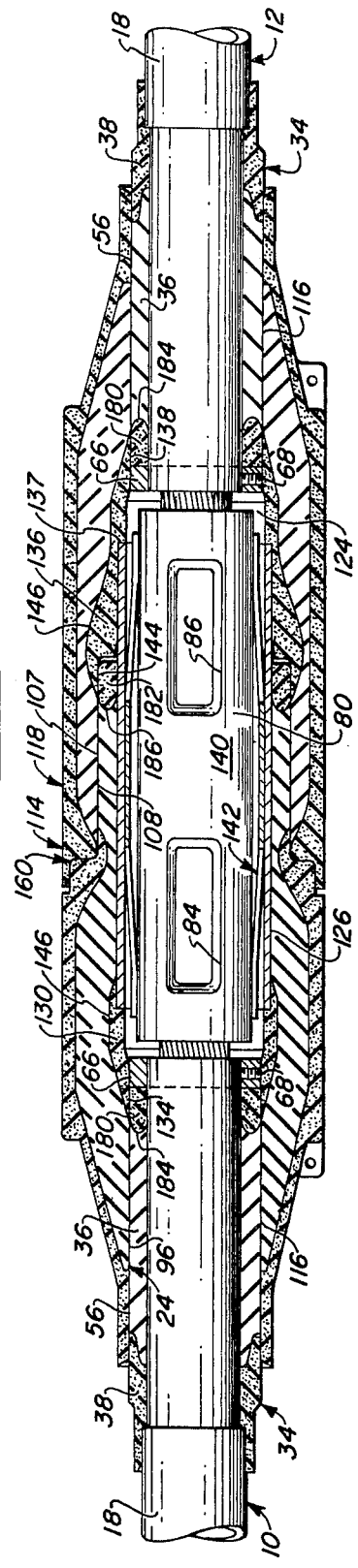
FIG. 1
FIG. 2

INTERNAL STRESS-GRADING SYSTEM FOR ELECTRICAL CONNECTIONS

The present invention relates generally to electrical connections and pertains, more specifically, to an internal stress-grading system for protecting against deleterious electrical stress concentration within electrical connections made up of pre-molded component parts capable of being assembled in the field for service under high voltage conditions.

In recent years, increased emphasis has been placed upon the development of underground electrical power distribution systems, especially in light industrial, commercial and residential areas. Various power distribution components, such as shielded electrical cables, transformers and electrical connectors have been evolved for use in such systems.

Among these components, shielded electrical connectors have been developed which include pre-molded component parts that are assembled easily in the field at the terminal ends of electrical cables so as to facilitate the fabrication of electrical connections and enable increased ease in the construction and installation of underground power distribution systems. The numerous advantages of such connectors have given rise to a demand for connectors of the same type which will operate successfully under even higher voltages than those voltages already accommodated by earlier connectors.

One critical factor in the construction and use of connections employing pre-molded connector elements is the control of electrical stresses within the assembled connection. Because such connections aree assembled in the field from individual component parts, air can be trapped at locations along the various mating surfaces. Any concentration of electrical stress at these locations would have exceptionally deleterious effects upon the continued integrity of the insulation of the connection. Operation under even higher voltage conditions further aggravates any possible stress concentration problems.

Internal shielding arrangements have been developed for alleviating potentially harmful electrical stresses at critical locations. However, operations at increased voltages require still further innovations to cope with the problems of deleterious electrical stress concentration within the assembled connector elements of an electrical connection which is to serve under higher voltage conditions, i.e., at 25 kV and above.

It is therefore an object of the invention to provide an internal stress-grading system for protecting against deleterious electrical stress concentration in an electrical connection made up of assembled component parts.

Another object of the invention is to provide such an internal stress-grading system as an integral part of pre-molded elastomeric connector component parts capable of assembly in the field for the construction of electrical connections in high voltage power distribution systems.

Still another object of the invention is to provide an internal stress-grading system which alleviates deleterious concentration of electrical stress at locations where the segments of a segmented internal shield are joined within an assembled electrical connection.

A further object of the invention is to provide a particular profile configuration at the boundaries of a segmented internal shield at locations where the segments are joined to more effectively control electrical stress distribution at such locations and preclude deleterious concentration of electrical stresses at those locations.

A still further object of the invention is to provide an internal stress-grading system as described above and which is effective upon assembly of the component parts of the electrical connections, without requiring unusual assembly procedures or techniques in order to realize the advantages of the system.

The above objects, as well as still further objects and advantages, are attained by the invention which may be described briefly as providing an internal stress-grading system for protecting against deleterious electrical stress concentration in the vicinity of an internal shield located within an electrical connection comprised of pre-molded, axially extending elastomeric connector component parts, the internal shield being located within the connector component parts and having axially extending radially inner and outer tubular segments each assembled with another at a joint between complementary radially inner and outer axial surfaces located along consecutive radially inner and outer segments, the radially inner segments each being located in a sleeve-like portion of a connector component part, the sleeve-like portion having a first portion of conductive elastomeric material, and a second portion of insulating elastomeric material contiguous with the first portion, the first and second portions being joined along a generally continuous, void-free juncture, the juncture following a continuous contour which has an arcuate salient profile defining the boundary of the first portion.

The invention will be more fully understood, while still further objects and advantages will become apparent, in the following detailed description of a preferred embodiment thereof illustrated in the accompanying drawing, wherein:

FIG. 1 is an exploded, longitudinal cross-sectional view of an electrical connector constructed in accordance with the invention and being assembled at the terminal ends of high voltage shielded electrical cables which are to be connected; and FIG. 2 is a longitudinal cross-sectional view of the electrical connector assembled to complete an electrical connection between the cables.

Referring now to the drawing, and especially to FIG. 1 thereof, an electrical connection is to be made between a pair of high voltage shielded electrical cables 10 and 12 in a power distribution system. Each of the cables 10 and 12 has a central conductor 14 surrounded by an insulating jacket 16 which itself lies within an external shield 18. In order to effect a connection between the terminal ends of the cables, a first, or plug, housing member 20 is slipped over the terminus 22 of cable 10 and is moved along the cable away from the terminus thereof. Such movement of the housing member 20 along the cable 10 is accomplished with little or no resistance since the housing member is provided with an axially extending internal bore 24 having an internal diameter considerably larger than the overall external diameter of the cable. Likewise, a second, or receptacle, housing member 26 is slipped over the terminus 28 of cable 12 and is advanced along the cable in a direction away from the terminus thereof.

A portion of each external shield 18 is removed so as to expose a portion 30 of the insulating jacket 16 between each terminus and the termination 32 of the shield. A pair of sleeves 34 are then slipped over the terminal ends of the cables, one sleeve 34 upon each cable, and each sleeve is moved along its respective cable in a direction away from the terminus thereof.

the sleeves 34 preferably are fabricated of an elastomeric material and include a sleeve portion 36 of an electrically insulating elastomer, and a sleeve portion 38 of an electrically conductive elastomer axially related to and integral with sleeve portion 36. The sleeve portions 36 and 38 preferably are molded together so that the sleeve portions are contiguous and joined together in a single assembly, the juncture 40 between the sleeve portions being continuous and void-free. Preferably, the compounds of the sleeve portions are based upon the same polymer to assure strong bonding. An ethylene-propylene terpolymer, available under DuPont's trademark NORDEL, is an example of a polymer which has been used successfully for this purpose. Insulating NORDEL is used for sleeve portion 36 and conductive NORDEL is used for sleeve portion 38. At least parts of the sleeve portion 38 can be in the form of a conductive coating, especially in locations of relatively thin cross-section, applied to sleeve portion 36. For the purposes of the present description, the term "elastomer" is meant to include such coatings.

Each sleeve 34 has an internal bore 42 which extends axially from end 44 to end 46 of the sleeve 34, the bore being resiliently dilatable by virtue of the resilient nature of the sleeve material. The internal bore 42 has a first internal surface 50 of a first diameter adjacent end 44 of the sleeve and extending through the sleeve portion 36 and a part of the sleeve portion 38 to a shoulder 52 which is located between the first internal surface 50 and a second internal surface 54 adjacent the other end of the sleeve and having a diameter slightly larger than the diameter of the first internal surface. The relative dimensions of the first internal surface 50 and the diameter of the external surface of insulating jacket 16 are such that the insulating jacket 16 may be inserted into the sleeve 34 by hand, the resilient property of the sleeve permitting the sleeve to be radially expansible thereby allowing a slight dilation of the internal bore 42 to admit the insulating jacket. Thus, the internal bore 42, along the first surface 50 thereof, will grip the exposed length 30 of the insulating jacket 16 in a tight fit. The tight fit along the exposed length of the insulating jacket increases the dielectric strength of the creep path along the outer surface of the insulating jacket between the end 44 of the sleeve and the termination 32 of the shield 18 to assure that current will not pass between the conductor 14 and the shield 18 along the insulating jacket 16. Movement of the sleeve 34 along the cable is continued until the shoulder 52 abuts the termination 32 of the shield 18. At this position of the sleeve, the internal bore 42 is resiliently dilated along the second internal surface 54 thereof to grip the shield 18 in electrical contact therewith. Each sleeve has an external surface 56 common to both portions 36 and 38.

Once the sleeves 34 are in proper position upon their respective cables, a retainer shown in the form of retaining ring 66 is slipped over the terminus of each cable and is affixed to the insulating jacket 16 in abutting relationship with the end 44 of each sleeve. Each retaining ring 66 preferably is anchored to the insulating jacket 16 by fastener means shown in the form of set screws 68 (see FIG. 2) which positively engage the insulating jacket 16 to anchor the ring 66 in place. The set screws 68 are threaded radially through each ring 66 to radially enter the jacket 16 and may, but need not necessarily, contact the conductor 14 of the cable. Each sleeve 34 is thus positively retained against movement toward the cable terminus by a retaining ring 66. Movement in the opposite direction is restrained by abutment of the shoulder 52 with the termination 32 of a shield 18. Thus, each sleeve 34 presents an external surface 56 of prescribed external diameter common to both the first and second sleeve portions and the termination 32 of the shield 18 is encased and protected by the sleeve portion 38 while the shield 18 is electrically connected with the external surface 56 of prescribed diameter.

A portion of the insulating jacket 16 adjacent the terminus of each cable is removed to expose a length 72 of conductor 14 between each terminus 22 and 28 and the termination 74 of the insulating jacket. While these portions of jacket 16 may be removed either before or after the installation of the sleeves 34 and the retaining rings 66, removal is preferably effected subsequent to the installation of the retaining rings so that the retaining rings may serve as guides for the location of the termination 74 of the insulating jacket 16.

The bared ends 76 of the conductors 14 are then electrically connected by means of an electrical connector element shown in the form of a tubular metallic contact 80 having a longitudinal aperture 82. Each conductor 14 is inserted into a respective end of aperture 82 and the contact 80 is crimped at 84 and 86 to affix the contact 80 to the conductors 14 in a well-known manner.

The first housing member 20 is seen to have a composite construction fabricated of an elastomeric material. The composite structure includes an inner portion 90 of an electrically insulating elastomer and an outer portion 92 of an electrically conductive elastomer. The inner and outer portions 90 and 92 preferably are molded together, such as by molding the inner portion first and then molding the outer portion around the inner portion to form the composite housing member, so that the housing member 20 is an integral structure having contiguous inner and outer portions joined in a single assembly, the juncture 94 between the inner and outer portions 90 and 92 being continuous and void-free to enable electrical stresses to be kept within control along the length of the housing member. Both housing members 20 and 26 preferably are fabricated of the same materials employed in the fabrication of the sleeves 34.

The internal bore 24 of the first housing member 20 has a first portion 96 common with and extending axially through the inner and outer portions 90 and 92 adjacent one end of the housing member. The relative dimensions of the first portion 96 of the internal bore 24 and the external surface 56 of the corresponding sleeve 34 are such that as the housing member 20 is moved toward the cable terminus 22 and over the sleeve 34, the internal bore portion 96 is resiliently dilated to grip the external surface 56 in watertight relationship therewith.

The second housing member 26 is also composite structure including an inner portion 100 and an outer portion 102, and the internal bore 104 thereof is likewise common to both the inner portion 100 and the outer portion 102, the relative dimensions of the first portion 106 of the internal bore 104 and its corresponding sleeve 34 bearing the same relationship as described above in connection with the first housing member 20 and its corresponding sleeve 34. The housing members 20 and 26 are provided with corresponding portions for cooperating with one another in watertight relationship, such portions being shown in the form of a sleeve-like plug extension 107 of the first housing member 20 and a corresponding receptacle 108 in the second housing member 26. After the housing members are both pulled toward each respective terminus 22 and 28 and thus toward one another, as seen in FIG. 2, the plug 107 engages the receptacle 108 to establish a watertight seal between the housing members, as well as to make electrical contact between the outer portions 92 and 102 of the housing members by the engagement of plug portion 110 with receptacle portion 112. The tight fit between the housing members 20 and 26 and their respective sleeves 34 assures that the outer portions 92 and 102 grip the respective second sleeve portions 38 to make electrical contact therewith and thus assure electrical continuity of the outer shield 18 across the completed connection 114. At the same time, the tight fit increases the dielectric strength of the creep path along the portion 116 of the external surface 56 of the sleeve which is contiguous with the inner portion of each housing member.

The internal bores 24 and 104, respectively, of the housing members 20 and 26 each have a second portion 120 and 122, respectively, which, when the housing members are assembled in an integral housing assembly 118 over the sleeves 34, establish a closed chamber 124 within which the contact 80 is housed and sealed. An electrically conductive and heat conductive metallic tube 126 is located within the second bore portion 120 of the first housing member 20 and enters the second bore portion 122 of the second housing member 26 upon assembly of the housing members. Tube 126 is relatively rigid and provides an internal support for plug 107 to assure a tight seal between plug 107 and receptacle 108 and preferably is fabricated of aluminum. The first housing member is provided with a bridging portion 130 of electrically conductive elastomeric material which extends between one end 132 of the metallic tube 126 and a radially inner axial surface 134 of the first bore portion 96. Likewise, the second housing member 26 includes a bridging portion 136 of electrically conductive elastomeric material extending between the other end 137 of the metallic tube 126 and a radially inner axial surface 138 of the first bore portion 106 of the internal bore 104 of that housing member. Thus, when the housing members are assembled in the integral housing assembly 118, as seen in FIG. 2, the closed chamber 124 is surrounded by a wall of electrically conductive and heat conductive material extending coaxially with the contact 80 and the conductors 14 and spaced radially from the outer surface 140 of the contact. While it is contemplated that the housing assembly 118 may be supplied in the form of a unitary housing, it has been found preferable to assemble the housing in the field from a pair of housing members, as described above.

Prior to the assembly of the two housing members 20 and 26 and the consequent closing of the chamber 124, a member of heat conductive material in the form of metallic member 142 is placed upon the outer surface 140 of the contact 80 such that upon assembly of the housing members and the closing of the chamber, the conductive member 142 will contact both the electrical contact 80 and the metallic tube 126 to provide a path for the conduction of heat across the gap between the contact and the tube thereby enabling dissipation of excessive heat from the contact 80 and increasing the effective capacity of the connection 114. At the same time, the conductive member 142 is electrically conductive and thus eliminates any deleterious potential differences between the wall of the chamber 124 and the contact 80 and conductors 14. Bridging portion 136 of the second housing member 26 is also continued around the bottom 143 of the receptacle 108 at 144 so as to eliminate deleterious electrical stresses across any gap between the end of the plug 107 and the bottom of the receptacle 108. The bridging portions 130 and 136 preferably are integrally molded with the inner portions 90 and 100 of the respective housing members 20 and 26 so as to provide a continuous and void-free juncture 146 between each bridging portion and its respective inner portion.

The combination of the housing 118 with the corresponding sleeves 34 enables ready assembly in the field since the sleeves 34, which incorporate thin wall sections relative to the corresponding wall sections of the housing, are easily placed in proper position upon the cables by hand without damage to the cable and especially to the shield. The greater forces needed to pull the housing or housing members over the sleeves are easily applied to the larger diameter housing or housing members. The sleeves 34, being secured against movement in response to such pulling forces by virtue of the retaining rings 66, can withstand such pulling forces and the pulling forces need not be applied directly to the more delicate shield 18. In addition, cables of different diameters may be accommodated without changing the size or configuration of the housing by merely providing sleeves 34 having internal bores of various diameters while maintaining the external surfaces 56 of the sleeves at the same diameter. In certain instances, it may be desirable to have cable 10 differ in size from cable 12 and such a difference is easily accommodated by employing sleeves 34 of different diameter internal bores. Thus, by selecting the proper sleeves 34 the connector may be adapted to accommodate a wide variety of cable sizes.

In order to assure that the connection completed by the assembly of the housing members 20 and 26 with one another is capable of withstanding the high voltages present between the conductor 22 and the shield 18 of the connected cables, the distribution of electrical potential differences within the dielectric of the connection in the vicinity of the outer shield 18 is controlled and any concentration which would increase the value of electrical stress to a deleterious amount at one particular location or another is avoided. One such location where there is a tendency for electrical stresses to become concentrated is in the vicinity of the junction 160 of the housing members 20 and 26. The tendency exists at this location in view of the presence of laterally extending surfaces on each of the housing members, the laterally extending surfaces defining the confronting end surfaces of the assembled housing members.

Thus, a laterally extending surface 162 extends between the root 164 of the axially extending plug 107 and the outside surface 166 of the remainder of the housing member 20, since the generally cylindrical surface of the plug 107 has a diameter smaller than the overall diameter of the outside surface 166. Likewise, a laterally extending surface 170 extends between the end 172 of the axially extending receptacle 108 and the outside surface 174 of the remainder of the housing member 26, since the generally cylindrical surface of the receptacle 108 has a diamter smaller than the overall diameter of the outside surface 174. Because there is a tendency for air to be trapped in voids present between these laterally extending surfaces 162 and 170 when the housing members 20 and 26 are assembled with one another, and since air is a relatively weak dielectric, these voids become possible regions where electrical discharges can occur, leading to the eventual breakdown of the insulation at these regions with concomitant failure of the connection.

In order to avoid such harmful electrical discharges, while avoiding a deleterious concentration of electrical stresses, the juncture 94 between the inner portion 90 and the outer portion 92 of the housing member 20 is made to follow a continuous contour which extends essentially to the surface of the plug 107 adjacent the root 164 thereof. Likewise, the juncture 176 between the inner portion 100 and the outer portion 102 of the housing member 26 follows a continuous contour which extends essentially to the surface of the receptacle 108, adjacent the end 172 thereof. In this manner, the electrical stresses within the insulating portions 90 and 100 of the housing members 20 and 26, respectively, are made to follow a generally continuous pattern in the vicinity of shield 18 with no abrupt changes in pattern to cause deleterious concentration of stresses. The term "continuous", as employed herein in connection with the contour of the junctures 94 and 176 and in connection with the patterns of electrical stress, is employed in a mathematical sense; that is, changes in direction are smooth and gradual rather than abrupt and angular.

Thus, the contour of the junctures 94 and 176 in the vicinity of the laterally extending surfaces 162 and 170, respectively, not only attains an advantageous pattern of electrical stress across the junction of the housing members 20 and 26, but also reduces to a minimum the voltage gradient along these laterally extending surfaces, thus tending to eliminate the establishment of corona within voids located between these surfaces and the deleterious effects associated with corona.

While such undesirable effects can be reduced or essentially eliminated by bringing the junctures 94 and 176 practically to the surfaces of the plug 107 and the receptacle 108, respectively, it has been found advantageous to extend the juncture 94 into the plug 107 such that the juncture will intersect the surface of the plug at 178, a short distance along the plug from the root 164 thereof. In this manner, the outer portion 92 will overlap the surface of the receptacle 108 when the housing members 20 and 26 are assembled to assure that all voids between the confronting laterally extending surfaces 162 and 170 are bounded by electrically conductive material. Likewise, juncture 176 preferably is made to intersect the surface of the receptacle 108 a short distance from the open end 172 thereof so that the outer portion 102 will overlap the plug 107 adjacent the root 164 thereof.

All of the structure thus far described in connection with FIGS. 1 and 2 is known and has been set forth in detail in U.S. Pat. No. 3,656,084. The following improvements enable the electrical connection to function at even higher voltages, i.e., at 25 kV and above, by providing an internal stress grading system which will have the effect of reducing any tendency for electrical potential differences to become concentrated in any particular region in the dielectric of the connection, thereby reducing the possibility of concomitant increases in the value of electrical stress in that region the phenomenon known in the art as stress concentration. Hence, the improvements will protect against deleterious electrical stress concentration in the vicinity of the internal shield established by tube 126 and the related conductive elastomeric tubular segments, including bridging portions 130 and 136.

It has been observed that, at the higher operating voltages, relatively abrupt changes in the contour of the electrical stress pattern tend to take place at locations where there is a transition from the conductive elastomeric material of the internal shield segments, comprised of bridging portions 130 and 136, and the insulating elastomeric material of the tubular, or sleeve-like, portions of the sleeves 34 and plug extension 107 engaged by the bridging portions. In the device illustrated in the aforementioned U.s. Pat. No. 3,656,084, the changes in the contour of the electrical stress pattern at these locations can become so abrupt, under high voltages, as to cause deleterious concentrations of electrical stress which could result in a breakdown of the insulation and eventual failure of the connection.

In order to protect against such deleterious concentrations of electrical stress, the segmented internal shield has been provided with radially inner segments in the form of portions 180 and 182 of conductive material, which radially inner segments are engaged by radially outer segments of the internal shield, in the form of bridging portions 130 and 136. Portions 180 each are constructed as a contiguous portion of a sleeve 34 and preferably are fabricated of a conductive elastomeric material integral with the insulating elastomeric material portion 36 of each sleeve 34. Portions 180 thus become the terminal end portions of the internal shield. The juncture 184 between portions 36 and 180 of each sleeve 34 is void-free and represents the boundary defining each terminal end of the internal shield. Likewise, the sleeve-like portion of plug extension 107 is provided with portion 182 preferably constructed integral with plug extension 107 and being fabricated of a conductive elastomeric material. The juncture 186 is void-free and represents the boundary of portion 182. Thus, at each location where one segment of the inner shield is joined with the next consecutive segment, there is a joint between complementary radially inner and outer axial surfaces located along the consecutive radially inner and outer segments.

While the provision of portions 180 and 182 of conductive material tends to eliminate abrupt changes in the contour of the electrical stress pattern in the connection, and thus serves a stress grading function, it has been observed that a more advantageous grading of the electrical stress pattern is attained by providing the junctures 184 and 186 with a continuous contour which has an arcuate profile with the arcuate boundary of the corresponding portion 180 or 182 being convex, i.e., the radius of the arcuate configuration lying within the corresponding portion 180 or 182. The term "salient" is used herein to describe the semi-closed characteristic of the arcuate profile wherein the boundary is first directed outwardly toward the contiguous portion of insulating material and then gradually turns back inwardly toward the portion of conductive material, the term thus defining the orientation of the arc of the arcuate boundary. Thus, the junctures 184 and 186 follow a continuous contour which has an arcuate salient profile defining the boundary of a corresponding portion 180 or 182. The diameter of each arcuate salient profile is of about the same magnitude as the thickness of the wall of portion 180 or 182. Thus, juncture 184 follows an arcuate salient profile contour having a diameter of about the same magnitude as the wall thickness of sleeve 34, while juncture 186 follows an arcuate salient profile contour having a diameter of about the same magnitude as the wall thickness of the tubular, sleeve-like plug extension 107.

Thus, the addition of portions 180 and 182 of conductive material each with a juncture having an arcuate salient profile contour at locations where consecutive segments of the segmented internal shield are joined provides an internal stress-grading system which protects against the deleterious concentration of electrical stress at such locations.

It is to be understood that the above detailed description of an embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. In an internal stress-grading system for protecting against deleterious electrical stress concentration in the vicinity of an internal shield located within an electrical connection comprised of pre-molded, axially extending elastomeric connector component parts, the internal shield being located within said connector component parts and having axially extending radially inner and outer tubular segments each assembled with another at a joint between complementary radially inner and outer axial surfaces located along consecutive radially inner and outer segments, the radially inner segments each being located in a sleeve-like portion of a connector component part, said sleeve-like portion having a first portion of conductive elastomeric material, and a second portion of insulating elastomeric material contiguous with the first portion, said first and second portions being joined along a generally continuous, void-free juncture, the juncture following a continuous contour which has an arcuate salient profile defining the boundary of the first portion.

2. The invention of claim 1 wherein said sleeve-like portions each have a given wall thickness and each arcuate salient profile has a diameter of about the same magnitude as the given wall thickness of the corresponding sleeve-like portion at said boundary.

3. In an internal stress-grading system for protecting against deleterious electrical stress concentration in the vicinity of an internal shield located within an electrical connection between termini of high-voltage shielded electrical cables, each cable having a conductor surrounded by an insulating jacket within a conductive shield, the electrical connection including an electrical contact connecting the conductors and pre-molded elastomeric connector component parts, the internal shield surrounding the contact connected between the termini of the cable conductors and having opposite terminal end portions located in opposite connector component parts, each end portion having a terminal end, each terminal end of the internal shield being spaced from the terminus of a corresponding cable in the direction extending along the cable, the connector component parts each having a first portion of conductive elastomeric material including a terminal end portion of the internal shield, a second portion of insulating elastomeric material contiguous with the first portion, and an opening in said first and second portions receiving the insulating jacket of a cable, said first and second portions being joined along a generally continuous, void-free juncture, the juncture following a continuous contour which has an arcuate salient profile at the terminal ends of the internal shield.

4. The invention of claim 3 wherein the connector component parts include sleeve-like elements, each having a given wall thickness, and each arcuate salient profile has a diameter of about the same magnitude as the given wall thickness of the corresponding sleeve-like element at the terminal end of the internal shield.

5. In an internal stress-grading system for protecting against deleterious electrical stress concentration in the vicinity of an internal shield located within an electrical connector having an electrical contact therein at the terminus of a conductor, the internal shield surrounding the contact and having a terminal end portion including a terminal end, the terminal end of the shield being spaced from the terminus of the conductor in the direction extending along the conductor, the connector having a first portion of conductive material including the terminal end portion of the shield, a second portion of insulating material contiguous with the first portion, and an opening passing through the first and second portions, said first and second portions being joined along a generally continuous, void-free juncture, the juncture following a continuous contour which has an arcuate salient profile at the terminal end of the shield.

6. The invention of claim 5 wherein the first and second portions are fabricated of elastomeric materials.

7. The invention of claim 6 wherein the terminal end portion of the internal shield is a sleeve-like member having a given wall thickness and the arcuate salient profile has a diameter of about the same magnitude as the wall thickness of the sleeve-like member.

8. In an internal stress-grading system for protecting against deleterious electrical stress concentration within an electrical connection including an electrical connector, the connector having a housing member of elastomeric material including a plug extending axially to a terminal end of the housing member, a first portion of conductive elastomeric material and a second portion of insulating elastomeric material contiguous with the first portion along a generally continuous, void-free juncture spaced axially from the terminal end of the housing member in the direction along the plug, said first portion extending between the terminal end and the juncture, and the juncture following a continuous contour which has an arcuate salient profile defining the boundary of the first portion.

9. The invention of claim 8 wherein the plug has a sleeve-like configuration with a given wall thickness at the terminal end thereof and the arcuate salient profile has a diameter of about the same magnitude as the given wall thickness of the sleeve-like configuration.

10. A composite sleeve for placement between the terminus of an electrical cable and an electrical connector housing having an inner conductive shielding layer and an outer conductive shielding layer, the cable having a conductor surrounded by an insulating jacket, said composite sleeve comprising:

a first sleeve portion of conductive elastomeric material at one end of the sleeve;

a second sleeve portion of insulating elastomeric material integral with and axially related to said first sleeve portion;

a third sleeve portion of conductive elastomeric material integral with and axially related to the second sleeve portion at the other end of the sleeve;

an axially extending external surface common to said first, second, and third sleeve portions;

a resiliently dilatable internal bore extending from end to end of the sleeve through said first, second, and third sleeve portions;

a first generally continuous, void-free juncture between said first and second sleeve portions, said first juncture extending from said internal bore to said external surface and following a continuous contour which has an arcuate salient profile defining the boundary of said first portion, said first sleeve portion forming an extension of said inner conductive shielding layer when said composite sleeve is disposed between said terminus and said housing; and a second generally continuous, void-free juncture between said second sleeve portion and said third sleeve portion, said second juncture extending from said internal bore to said external surface, at least a portion of said second juncture extending from said internal bore following a continuous contour which has a flared profile relative to said internal bore and said second sleeve portion, said third sleeve portion forming an extension of said outer conductive shielding layer when said composite sleeve is disposed between said terminus and said housing.

11. The invention of claim 10 wherein the sleeve has a given wall thickness and the arcuate salient profile defining said first juncture has a diameter of about the same magnitude as the wall thickness of the sleeve.

* * * * *